United States Patent
Ahn et al.

(10) Patent No.: US 9,116,327 B2
(45) Date of Patent: Aug. 25, 2015

(54) IMAGING LENS SYSTEM

(71) Applicant: KOLEN CO., LTD., Gyeonggi-do (KR)

(72) Inventors: Chi Ho Ahn, Gyeonggi-do (KR); Jae Hoon Cho, Gyeonggi-Do (KR); Ji Eun Kim, Seongnam-si (KR); Chan Goo Kang, Daejeon (KR); Se Jin Kim, Seoul (KR)

(73) Assignee: KOLEN CO., LTD. (KR)

( * ) Notice: Subject to any disclaimer, the term of this patent is extended or adjusted under 35 U.S.C. 154(b) by 2 days.

(21) Appl. No.: 14/067,638

(22) Filed: Oct. 30, 2013

(65) Prior Publication Data

US 2014/0184877 A1 Jul. 3, 2014

(30) Foreign Application Priority Data

Dec. 31, 2012 (KR) .......... 10-2012-0158535

(51) Int. Cl.
*G02B 9/02* (2006.01)
*G02B 9/12* (2006.01)
*G02B 13/00* (2006.01)

(52) U.S. Cl.
CPC .............. *G02B 13/0035* (2013.01); *G02B 9/02* (2013.01); *G02B 9/12* (2013.01)

(58) Field of Classification Search
CPC ......... G02B 9/02; G02B 9/12; G02B 13/0035
USPC .......... 359/708–716, 784, 749–753, 680–682
See application file for complete search history.

(56) References Cited

U.S. PATENT DOCUMENTS

| 2009/0231734 A1* | 9/2009 | Choi ............................ 359/784 |
| 2011/0228157 A1 | 9/2011 | Tang et al. |
| 2012/0188654 A1* | 7/2012 | Huang .......................... 359/713 |

OTHER PUBLICATIONS

Korean Intellectual Property Office Notice of Non-Final Rejection Application No. 10-2012-0158535 Issued: Dec. 24, 2013 7 pages.

* cited by examiner

*Primary Examiner* — Scott J Sugarman
*Assistant Examiner* — Mitchell Oestreich
(74) *Attorney, Agent, or Firm* — St. Onge Steward Johnston & Reens LLC (57) ABSTRACT

An imaging lens system includes, sequentially from an object side to an image side: a first lens having a positive refractive power; a second lens having a negative refractive power; and a third lens having a negative refractive power, wherein a viewing angle θ satisfies following condition, 0.3<|tan θ|<0.8.

17 Claims, 6 Drawing Sheets

IMAGING LENS SYSTEM

FIELD OF THE INVENTION

The present invention relates to an imaging lens system.

BACKGROUND OF THE INVENTION

Cameras using a solid state image sensor such as a charge coupled device (CCD) or a complementary metal oxide semiconductor (CMOS) image sensor have been rapidly distributed.

In order to improve a resolution of a camera, a degree of pixel integration of a solid state image sensor has to be increased. Also, as cameras have become smaller and lighter due to the improvement of performance of lens optics built into them, and thus, cameras are being widely integrated into various mobile devices.

In lens optics included in such cameras, when the number of lenses increases, a desired performance may be obtained; however, increasing the number of lenses is not suitable for small and light cameras with lower costs. Thus, a design is necessary that is suitable for obtaining the desired performance of small and light cameras.

In such a lens design, a method of realizing a fixed focus lens system by using two to four lenses is being widely used, and a structure of an individual lens is determined in consideration of merits in each case, and specification of a desired performance. For example, if two lenses are used, aberration may not be sufficiently corrected in accordance that a size of pixel is reduced. If four lenses are used, the aberration may be sufficiently corrected, but the total length of the lens system is increased.

Therefore, various designs for meeting desired performance specifications such as a focal length, a viewing angle, and aberration correction by using a small number of lenses, that is, two to four lenses, are being suggested.

SUMMARY OF THE INVENTION

The present invention provides an imaging lens system including three lenses.

According to an aspect of the present invention, there is provided an imaging lens system including, sequentially from an object side to an image plane side: a first lens having a positive refractive power; a second lens having a negative refractive power; and a third lens having a negative refractive power, wherein a viewing angle θ may satisfy a following condition, $$0.3 < |\tan \theta| < 0.8.$$

The imaging lens system may further satisfy a following condition $$9.5 < TTL/BFL < 10.5,$$

where TTL denotes a distance from an object side surface of the first lens to the image plane, and BFL denotes a distance from an image side surface of the third lens to the image plane.

The imaging lens system may further satisfy a following condition $$0.7 < TTL/f < 1.5,$$

where TTL denotes a distance from an object side surface of the first lens to the image plane, and f denotes a focal length of the imaging lens system.

The imaging lens system may further satisfy a following condition $$0.7 < TTL/f < 1.5,$$

where TTL denotes a distance from an object side surface of the first lens to the image plane, and f denotes a focal length of the imaging lens system.

The imaging lens system may further satisfy a following condition $$1.0 < D1/D3 < 2.0,$$

where D1 denotes a semi-aperture of the first lens at the object side, and D3 denotes a semi-aperture of the third lens at the image plane side.

The first lens may have the largest semi-aperture from among the first lens, the second lens, and the third lens.

The second lens may have the smallest semi-aperture from among the first lens, the second lens, and the third lens.

The first lens may have a meniscus shape that is convex toward the object side.

The second lens may have a meniscus shape that is convex toward the object side.

The third lens may have a meniscus shape that is convex toward the image plane side.

The third lens may have at least one aspherical surface.

The third lens may have a plurality of inflection points.

The second lens may have at least one aspherical surface.

The second lens may have a plurality of inflection points.

The first lens may have at least one aspherical surface.

The first lens, the second lens, and the third lens may be formed of a plastic material.

A stop may be disposed between the first lens and the second lens.

An infrared-ray (IR) pass filter may be disposed between the third lens and an image plane.

According to another aspect of the invention, there is provided an imaging apparatus including: an imaging lens system according to the above description; and an image sensor for converting an optical image formed by the imaging lens system into an electric signal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining preferred embodiments of the invention with reference to the attached drawings. Like reference numerals in the drawings denote like elements.

Figure 1:
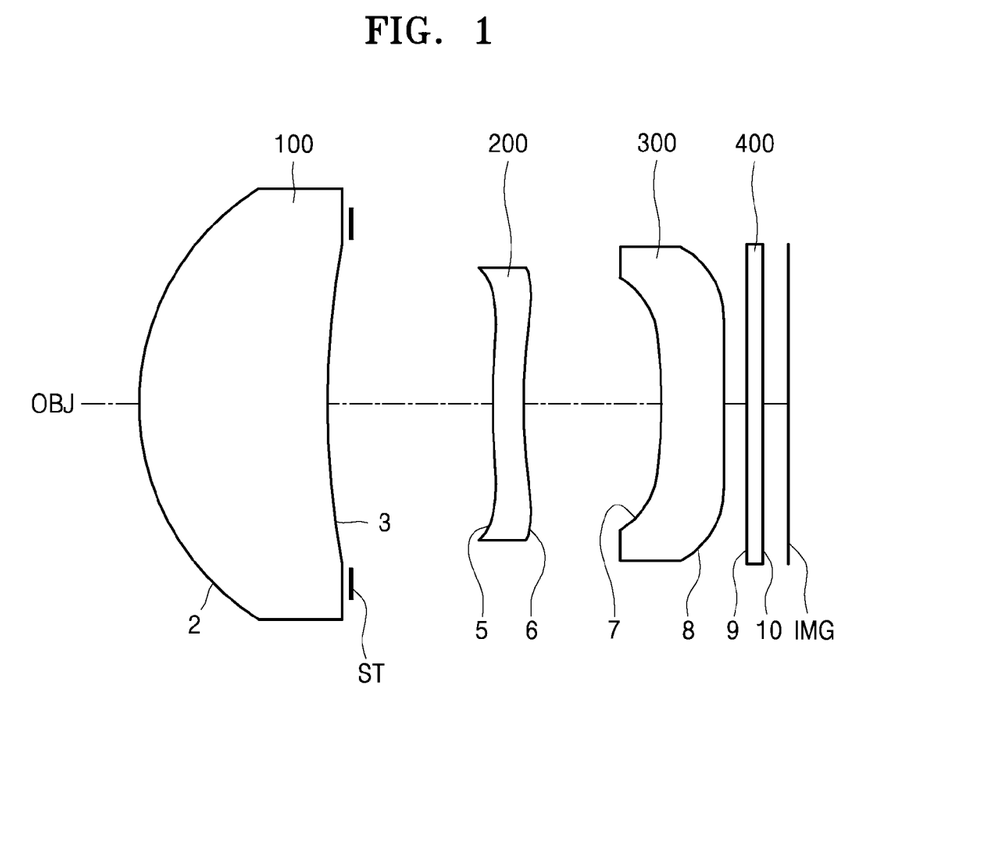
FIG. 1 is a diagram showing an optical arrangement of an imaging lens system according to an embodiment of the present invention.
Figure 3:
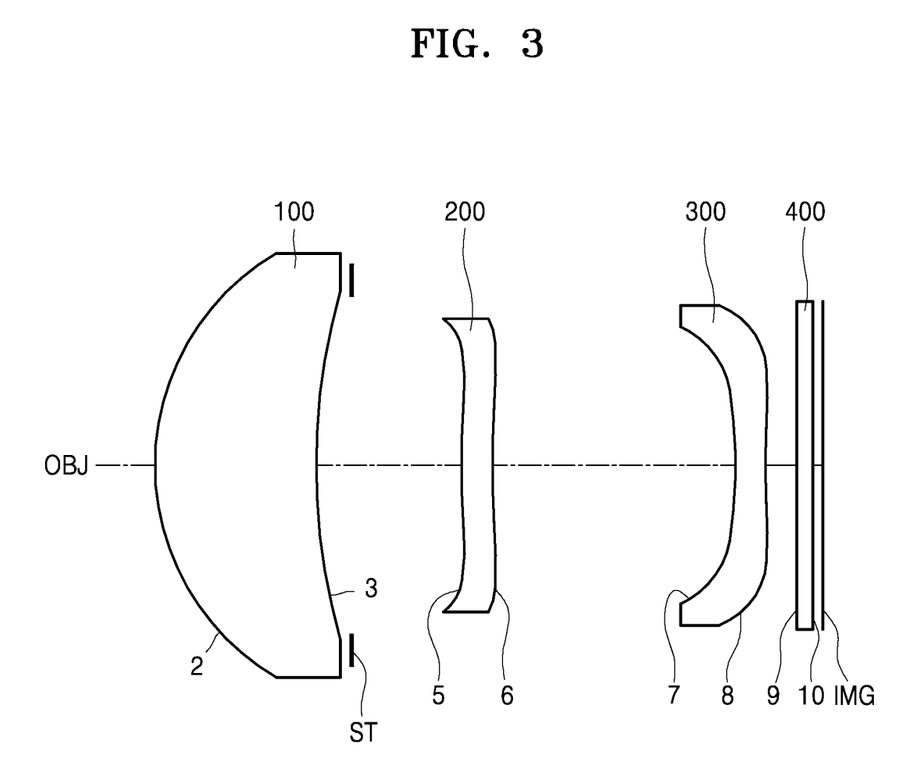
FIG. 3 is a diagram showing an optical arrangement of an imaging lens system according to another embodiment of the present invention.
Figure 5:
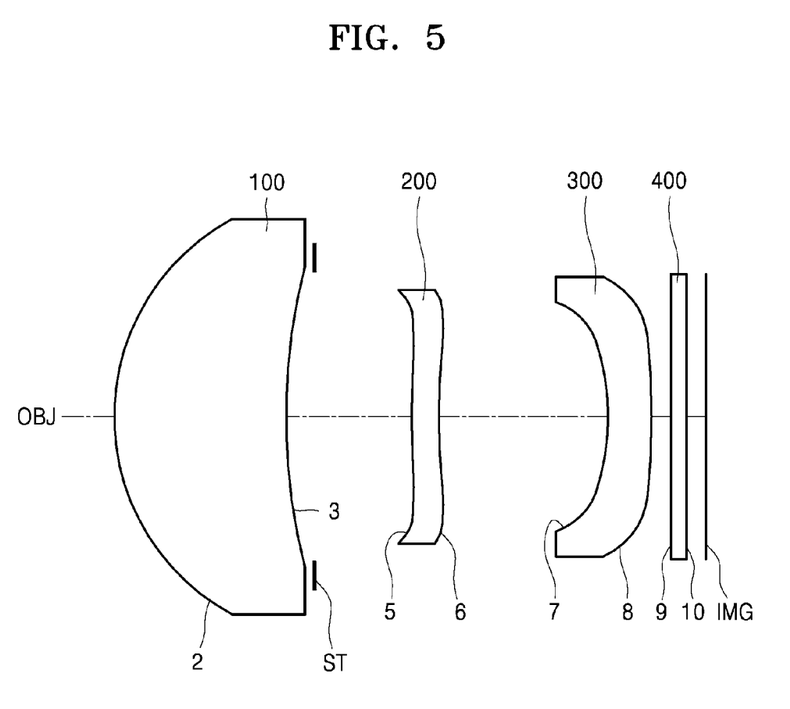
FIG. 5 is a diagram showing an optical arrangement of an imaging lens system according to another embodiment of the present invention.

FIGS. 1, 3, and 5 are diagrams showing imaging lens systems according to embodiments of the present invention.

Referring to FIGS. 1, 3, and 5, an imaging lens system includes a first lens 100 having a positive refractive power, a second lens 200 having a negative refractive power, and a third lens 300 having a negative refractive power that are sequentially arranged from an object OBJ side to an image plane IMG side.

A viewing angle θ of the imaging lens system satisfies following condition.

$$0.3 < |\tan\theta| < 0.8 \quad (1)$$

The above condition (1) defines the viewing angle of the imaging lens system. In a range that exceeds the highest limit, a spherical aberration and a coma aberration increase. In a range that is below the lowest limit, the spherical aberration and the coma aberration are reduced, but the viewing angle is excessively reduced.

The imaging lens system may further satisfy following condition.

$$9.5 < TTL/BFL < 10.5 \quad (2)$$

Here, TTL denotes a total length of the imaging lens system, that is, a distance from an object side surface of the first lens 100 to the image plane IMG, and BFL denotes a back focal length, that is, a distance from an image side surface of the third lens 300 to the image plane IMG.

The imaging lens system may further satisfy following condition.

$$0.7 < TTL/f < 1.5 \quad (3)$$

Here, TTL denotes the distance from the object side surface of the first lens 100 to the image plane IMG, and f denotes a focal length of the imaging lens system.

The above conditions (2) and (3) are conditions for realizing a compact imaging lens system. The conditions (2) and (3) respectively denote a ratio of the total length with respect to the back focal length, and a ratio of the total length with respect to the entire focal length. In a range that exceeds the highest limit in each of the conditions (2) and (3), the spherical aberration may be reduced; however, the total length of the imaging lens system becomes too long. On the other hand, in a range that is below the lowest limit in each of the conditions (2) and (3), the imaging lens system becomes compact; however, it is difficult to correct the spherical aberration.

The imaging lens system may further satisfy following condition.

$$1.0 < D1/D3 < 2.0 \quad (4)$$

Here, D1 denotes a semi-aperture of the first lens 100 at the object OBJ side, and D3 denotes a semi-aperture of the third lens 300 at the image plane IMG side.

According to the imaging lens system, the semi-aperture of the first lens 100 is the largest, unlike a general lens system including three lenses, in which the semi-aperture of a first lens is the smallest. The condition (4) defines a ratio of the semi-aperture of the first lens 100 at the object OBJ side with respect to the semi-aperture of the third lens 300 at the image plane IMG side, that is, a degree of greatness of the semi-aperture of the first lens 100 with respect to the semi-aperture of the third lens 300.

Each of the lenses configuring the imaging lens system will be described in detail as follows.

The first lens 100 has a positive refractive power, and may be formed as a meniscus that is convex toward the object side.

The first lens 100 may have at least one aspherical surface, or opposite surfaces may be both aspherical surfaces. The first lens 100 may have the largest semi-aperture and the largest refractive power among the lenses configuring the imaging lens system.

The second lens 200 has a negative refractive power, and may be formed as a meniscus shape that is convex toward the object side. The second lens 200 may have at least one aspherical surface, or opposite surfaces may be both aspherical surfaces. The second lens 200 may have a plurality of inflection points. That is, the object side surface and/or the image side surface of the second lens 200 may have a plurality of points where a sign of a curvature is changed. For example, the object side surface and/or the image side surface of the second lens 200 may be formed as aspherical surfaces, in which a sign of the curvature at a center portion thereof and a sign of the curvature at a peripheral portion are different from each other.

The third lens 400 has a negative refractive power, and may be formed as a meniscus shape that is convex toward the image side. The third lens 400 may have at least one aspherical surface, or opposite surfaces may be both aspherical surfaces. The third lens 300 may have a plurality of inflection points. That is, the object side surface and/or the image side surface of the third lens 300 may have a plurality of points where a sign of a curvature is changed. For example, the object side surface and/or the image side surface of the third lens 300 may be formed as aspherical surfaces, in which a sign of the curvature at a center portion thereof and a sign of the curvature at a peripheral portion are different from each other.

The second and third lenses 200 and 300 may serve as correcting lenses, and may correct various aberrations by adopting aspherical surfaces.

A stop ST may be disposed between the first and second lenses 100 and 200. However, a location of the stop ST is not limited thereto.

The first, second, and third lenses 100, 200, and 300 may be formed of a plastic material; however, the present invention is not limited thereto, and the first, second, and third lenses 100, 200, and 300 may be formed of a glass material. If the plastic material is used, manufacturing costs may be reduced to be less than a case where the glass material is used.

An infrared-ray (IR) pass filter 400 may be disposed between the third lens 400 and the image plane IMG. The IR pass filter 400 may transmit light of near-IR band, for example, a wavelength band of about 800 nm to about 950 nm.

Hereinafter, lens data according to embodiments of the present invention will be described in detail. In lens data, S denotes a surface number, ST denotes a stop, R denotes a radius of curvature, T denotes a thickness or a distance, Nd denotes a refractive index, and Vd denotes an Abbe's number. In addition, Fno. denotes an F number, and f denotes a focal length of the imaging lens system. R, T, and f may be expressed in units of mm, and * marked after the surface number denotes that the surface is an aspherical surface. The aspherical surface in the embodiments of the present invention may be defined as follows.

$$Z = \frac{Y^2}{R(1 + \sqrt{1 - (1+K)Y^2/R^2})} + AY^4 +$$

-continued $$BY^6 + CY^8 + DY^{10} + EY^{12} + FY^{14} + GY^{16} + HY^{18} + JY^{20}$$

Here, Z denotes a distance from a vertex of the lens in an optical axis, Y denotes a distance in a direction perpendicular to the optical axis, K denotes a conic constant, A, B, C, D, E, F, G, H, and J denote aspherical coefficients, and R is a radius of curvature at the vertex of the lens.

<First Embodiment>

FIG. 1 shows an optical arrangement of the imaging lens system according to the first embodiment of the present invention, and lens data of the first embodiment is as follows.

TABLE 1

Fno. = 1.6, f = 11.868

| S | R | T | Nd | Vd |
|---|---|---|---|---|
| OBJ | Infinity | 0.0000 | | |
| 2* | 4.4254 | 3.4516 | 1.5238 | 55.7283 |
| 3* | 22.6280 | 0.4278 | | |
| ST | Infinity | 2.6240 | | |
| 5* | 23.9624 | 0.5500 | 1.5238 | 55.7283 |
| 6* | 10.8748 | 2.5357 | | |
| 7* | −9.9690 | 1.1368 | 1.5238 | 55.7283 |
| 8* | 282.0169 | 0.4000 | | |
| 9 | Infinity | 0.3000 | | 64.1664 |
| 10 | Infinity | 0.4742 | | |
| IMG | infinity | 0.0000 | | |

Aspherical coefficients are as follows.

TABLE 2

| S | 2 | 3 | 5 | 6 | 7 | 8 |
|---|---|---|---|---|---|---|
| K | −0.9605 | −11.5565 | 0 | 13.9262 | 0 | −100 |
| A | 0.0011 | 0.0009 | −0.0021 | −9.84E−05 | −0.0085 | −0.003 |
| B | 1.65E−05 | −1.91E−05 | −0.0009 | −0.0011 | 3.93E−05 | −0.0009 |
| C | 1.98E−06 | 1.68E−05 | −6.13E−05 | −7.07E−05 | −0.0005 | −2.74E−06 |
| D | 1.34E−07 | −4.14E−06 | 2.97E−08 | −2.26E−06 | 6.78E−05 | −2.74E−06 |
| E | −3.96E−08 | 4.15E−07 | −5.48E−07 | −5.20E−07 | 1.52E−06 | 2.21E−07 |
| F | 3.09E−09 | −7.55E−09 | 7.02E−08 | 1.83E−07 | −1.44E−06 | −5.35E−08 |
| G | 1.39E−11 | −1.30E−10 | 1.87E−10 | −8.90E−09 | −2.22E−07 | 5.19E−09 |
| H | −1.02E−11 | −1.67E−10 | 4.81E−10 | −1.63E−09 | 1.61E−08 | −1.28E−09 |
| J | 3.21E−13 | 1.14E−11 | −4.66E−10 | 5.08E−11 | −1.66E−09 | 1.04E−10 |

Figure 2:
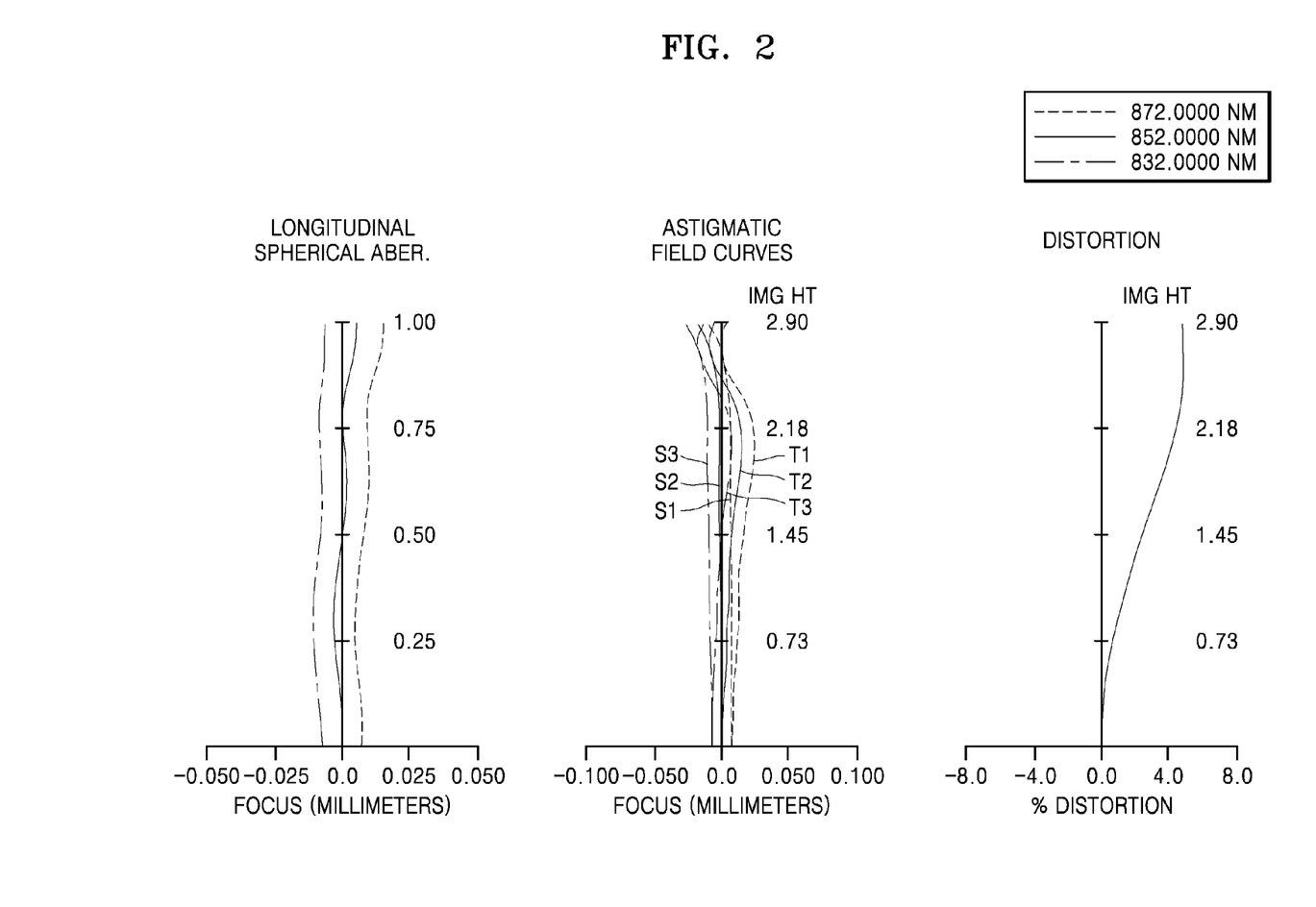
FIG. 2 is an aberration diagram showing a spherical aberration in a longitudinal direction, a field curvature, and a distortion of the imaging lens system according to the embodiment of the present invention.

FIG. 2 shows a longitudinal spherical aberration, an astigmatic field curves, and a distortion of the imaging lens system according to the first embodiment of the present invention.

The longitudinal spherical aberration, the astigmatic field curves, and the distortion are shown with respect to light having wavelengths of 872 nm, 852 nm, and 832 nm. In the astigmatic field curves, T1, T2, and T3 denote curvatures with respect to the three wavelengths on a tangential surface, and S1, S2, and S3 denote curvatures with respect to the three wavelengths on a sagittal surface.

<Second Embodiment>

FIG. 3 shows an optical arrangement of the imaging lens system according to the second embodiment of the present invention, and lens data of the second embodiment is as follows.

TABLE 3

Fno. = 1.6838, f = 11.911

| S | R | T | Nd | Vd |
|---|---|---|---|---|
| OBJ | Infinity | 0.0000 | | |
| 2* | 4.3034 | 2.8733 | 1.5238 | 55.7283 |
| 3* | 13.0828 | 0.6226 | | |
| ST | infinity | 2.0216 | | |
| 5* | 28.3459 | 0.5500 | 1.5238 | 55.7283 |
| 6* | 23.2018 | 4.3485 | | |
| 7* | −19.1535 | 0.5555 | 1.5238 | 55.7283 |
| 8* | 14.1682 | 0.5621 | | |
| 9 | infinity | 0.3000 | | 64.1664 |
| 10 | infinity | 0.1663 | | |
| IMG | infinity | 0.0000 | | |

Aspherical coefficients are as follows.

TABLE 4

| S | 2 | 3 | 5 | 6 | 7 | 8 |
|---|---|---|---|---|---|---|
| K | −0.8737 | 10.2281 | 0 | 69.1696 | 0 | 8.0479 |
| A | 0.0012 | 0.0004 | −0.0018 | 6.90E−05 | −0.0148 | −0.0081 |
| B | 3.05E−05 | −7.65E−07 | −0.0006 | −0.0006 | −0.0007 | −0.0014 |
| C | 3.03E−06 | 1.02E−05 | −6.62E−05 | −7.12E−05 | 5.44E−06 | 0.0001 |
| D | 9.74E−08 | −4.11E−06 | −1.24E−06 | 2.07E−06 | 1.84E−05 | −8.75E−06 |
| E | −4.11E−08 | 4.40E−07 | 1.17E−07 | 4.92E−07 | −4.28E−07 | −1.24E−06 |
| F | 3.31E−09 | −7.24E−09 | 6.18E−08 | 3.04E−08 | −9.61E−07 | 6.99E−08 |
| G | 3.79E−11 | −3.21E−10 | −2.64E−09 | −4.73E−09 | −1.59E−08 | 7.99E−09 |
| H | −9.61E−12 | −1.86E−10 | 2.69E−10 | −1.27E−09 | 1.54E−09 | −1.41E−09 |
| J | 1.92E−13 | 1.25E−11 | −2.60E−10 | 3.81E−11 | −1.73E−09 | 5.59E−11 |

Figure 4:
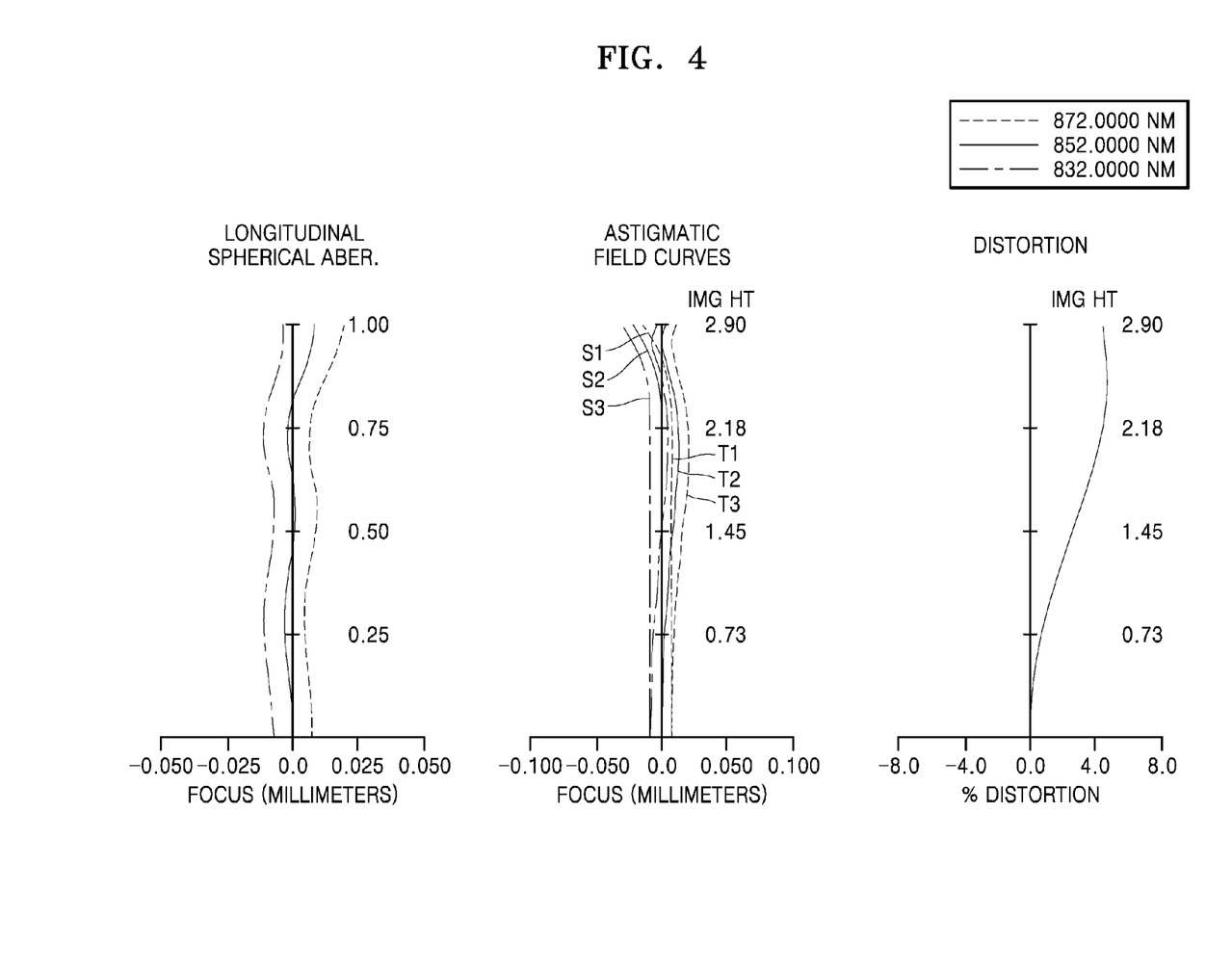
FIG. 4 is an aberration diagram showing a spherical aberration in a longitudinal direction, a field curvature, and a distortion of the imaging lens system of FIG. 3.

FIG. 4 shows a longitudinal spherical aberration, an astigmatic field curves, and a distortion of the imaging lens system according to the second embodiment of the present invention.

The longitudinal spherical aberration, the astigmatic field curves, and the distortion are shown with respect to light having wavelengths of 872 nm, 852 nm, and 832 nm. In the astigmatic field curves, T1, T2, and T3 denote curvatures with respect to the three wavelengths on a tangential surface, and S1, S2, and S3 denote curvatures with respect to the three wavelengths on a sagittal surface.

<Third Embodiment>

FIG. 5 shows an optical arrangement of the imaging lens system according to the third embodiment of the present invention, and lens data of the third embodiment is as follows.

TABLE 5

Fno. = 1.5841, f = 11.949

| S | R | T | Nd | Vd |
|---|---|---|---|---|
| OBJ | Infinity | 0.0000 | | |
| 2* | 4.3830 | 3.4816 | 1.5238 | 55.7283 |
| 3* | 15.9142 | 0.5516 | | |
| ST | Infinity | 2.0113 | | |
| 5* | 27.3688 | 0.5500 | 1.5238 | 55.7283 |
| 6* | 19.5099 | 3.4163 | | |
| 7* | −6.3764 | 0.8891 | 1.5238 | 55.7283 |
| 8* | −33.4093 | 0.4064 | | |
| 9 | Infinity | 0.3000 | | 64.1664 |
| 10 | infinity | 0.3935 | | |

TABLE 5-continued

Fno. = 1.5841, f = 11.949

| S | R | T | Nd | Vd |
|---|---|---|---|---|
| IMG | infinity | 0.0000 | | |

Aspherical coefficients are as follows.

TABLE 6

| S | 2 | 3 | 5 | 6 | 7 | 8 |
|---|---|---|---|---|---|---|
| K | −0.9198 | 11.306 | 0 | 46.8161 | 0 | 84.3904 |
| A | 0.0012 | 0.0008 | 0.0002 | 0.0017 | −0.0083 | −0.0012 |
| B | 2.14E−05 | −1.64E−05 | −0.0007 | −0.0008 | −0.0011 | −0.0021 |
| C | 2.41E−06 | 1.54E−05 | −8.39E−05 | −0.0001 | −0.0002 | 0.0002 |
| D | 1.35E−07 | −4.09E−06 | −1.70E−06 | 9.22E−07 | 3.40E−05 | −9.46E−06 |
| E | −4.02E−08 | 4.23E−07 | −3.00E−08 | 6.45E−07 | 8.64E−07 | −1.24E−06 |
| F | 3.11E−09 | −7.85E−09 | 4.80E−08 | 3.51E−08 | −1.41E−06 | 5.64E−08 |
| G | 1.94E−11 | −2.42E−10 | 1.55E−09 | −8.23E−09 | −1.47E−07 | 7.87E−09 |
| H | −9.93E−12 | −1.75E−10 | 5.83E−10 | −1.42E−09 | 1.54E−08 | −1.25E−09 |
| J | 2.99E−13 | 1.24E−11 | −4.99E−10 | 9.26E−11 | −1.73E−09 | 4.96E−11 |

Figure 6:
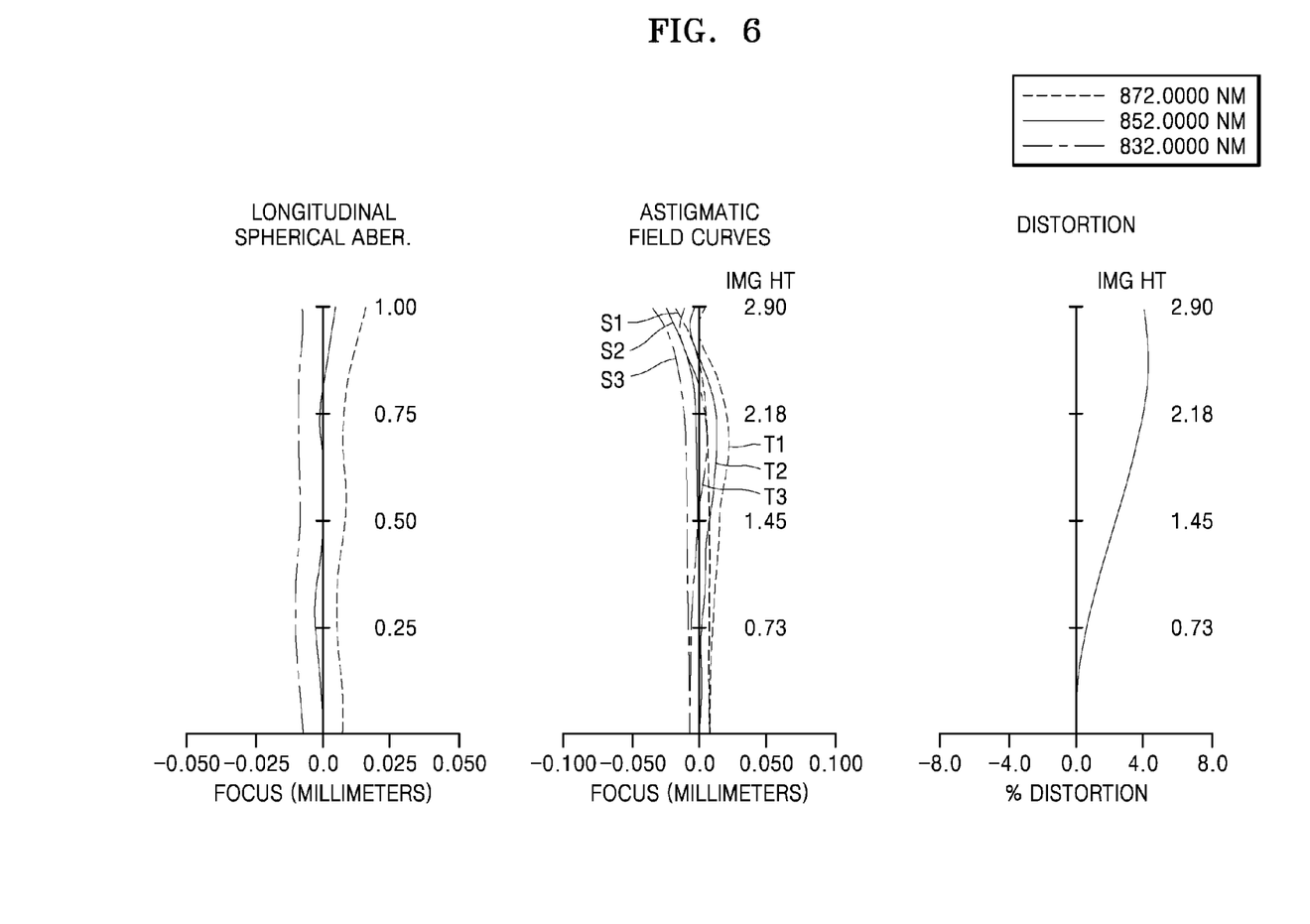
FIG. 6 is an aberration diagram showing a spherical aberration in a longitudinal direction, a field curvature, and a distortion of the imaging lens system of FIG. 5.

FIG. 6 shows a longitudinal spherical aberration, an astigmatic field curves, and a distortion of the imaging lens system according to the third embodiment of the present invention.

The longitudinal spherical aberration, the astigmatic field curvature, and the distortion are shown with respect to light having wavelengths of 872 nm, 852 nm, and 832 nm. In the astigmatic field curves, T1, T2, and T3 denote curvatures with respect to the three wavelengths on a tangential surface, and S1, S2, and S3 denote curvatures with respect to the three wavelengths on a sagittal surface.

The following table shows lens data relating to the above inequalities 1 through 4 in each embodiment, and shows that the lens data satisfies the above inequalities 1 through 4.

TABLE 7

| | First embodiment | Second embodiment | Third embodiment |
|---|---|---|---|
| $\theta$ | 26 | 26 | 26 |
| tan $\theta$ | 0.49 | 0.49 | 0.49 |
| condition 1 | 0.49 | 0.49 | 0.49 |
| TTL | 11.9 | 12 | 12 |
| BFL | 1.17 | 1.03 | 1.1 |
| condition 2 | 10.17 | 11.65 | 10.91 |
| TTL | 11.9 | 12 | 12 |
| F | 11.87 | 11.91 | 11.95 |
| condition 3 | 1 | 1.01 | 1 |
| D1 | 3.92 | 3.79 | 3.97 |
| D3 | 2.83 | 2.85 | 2.82 |
| condition 4 | 1.39 | 1.33 | 1.41 |

By using three lenses, the imaging lens system may be configured as an optical system that is lightweight, small, and has excellent optical performance.

Since the imaging lens system may incorporate an aspherical surface on at least one surface of the lenses, the aberration may be corrected easily, and manufacturing costs may be reduced by using the plastic material.

According to the embodiments of the present invention, the imaging lens system having excellent optical performance and a small and light structure may be configured. The imaging lens system of the present invention may be used in various kinds of imaging apparatuses having an image sensor that converts an optical image formed by the imaging lens system into an electric signal.

Also, the imaging lens system may be used to sense a motion by using near IR band light, and may be used in various electronic devices and portable devices requiring a motion sensing performance.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An imaging lens system comprising, sequentially from an object side to an image plane side:
   a first lens having a positive refractive power;
   a second lens having a negative refractive power; and
   a third lens having a negative refractive power,
   wherein a viewing angle $\theta$ satisfies a following condition, $0.3 < |\tan \theta| < 0.8,$ wherein the imaging lens system further satisfies a following condition $9.5 < TTL/BFL < 10.5,$ where TTL denotes a distance from an object side surface of the first lens to the image plane, and BFL denotes a distance from an image side surface of the third lens to the image plane.

2. The imaging lens system of claim 1, wherein the imaging lens system further satisfies a following condition $0.7 < TTL/f < 1.5,$ where TTL denotes a distance from an object side surface of the first lens to the image plane, and f denotes a focal length of the imaging lens system.

3. The imaging lens system of comprising, sequentially from an object side to an image plane side:
   a first lens having a positive refractive power;
   a second lends having a negative refractive power; and
   a third lens having a negative refractive power,
   wherein a viewing angle $\theta$ satisfies a following condition, $0.3 < |\tan \theta| < 0.8,$ and wherein the imaging lens system further satisfies a following condition $1.0 < D1/D3 < 2.0,$ where D1 denotes a semi-aperture of the first lens at the object side, and D3 denotes a semi-aperture of the third lens at the image plane side.

4. The imaging lens system comprising, sequentially from an object side to an image plane side:
   a first lens having a positive refractive power;
   a second lens having a negative refractive power; and
   a third lens having a negative refractive power,
   wherein a viewing angle $\theta$ satisfies a following condition, $0.3 < |\tan \theta| < 0.8,$ and wherein the first lens has the largest semi-aperature from among the first lens, the second lens and the third lens.

5. The imaging lens system comprising, sequentially from an object side to an image plane side:
   a first lens having a positive refractive power;
   a second lens having a negative refractive power; and a third lens having a negative refractive power,
wherein a viewing angle θ satisfies a following condition, $0.3 < |\tan \theta| < 0.8$, and wherein the second lens has the smallest semi-aperature from among the first lens, the second lens, and the third lens.

6. The imaging lens system of claim 1, wherein the first lens has a meniscus shape that is convex toward the object side.

7. The imaging lens system of claim 1, wherein the second lens has a meniscus shape that is convex toward the object side.

8. The imaging lens system of claim 1, wherein the third lens has a meniscus shape that is convex toward the image plane side.

9. The imaging lens system of claim 1, wherein the third lens has at least one aspherical surface.

10. The imaging lens system of claim 9, wherein the third lens has a plurality of inflection points.

11. The imaging lens system of claim 1, wherein the second lens has at least one aspherical surface.

12. The imaging lens system of claim 11, wherein the second lens has a plurality of inflection points.

13. The imaging lens system of claim 1, wherein the first lens has at least one aspherical surface.

14. The imaging lens system of claim 1, wherein the first lens, the second lens, and the third lens are formed of a plastic material.

15. The imaging lens system of claim 1, wherein a stop is disposed between the first lens and the second lens.

16. The imaging lens system of claim 1, wherein an infrared-ray (IR) pass filter is disposed between the third lens and an image plane.

17. An imaging apparatus comprising:
an imaging lens system of claim 1; and
an image sensor for converting an optical image formed by the imaging lens system into an electric signal.

* * * * *